(No Model.)
C. E. SCRIBNER.
MULTIPLE SWITCH BOARD TEST CIRCUIT.
No. 427,624. Patented May 13, 1890.
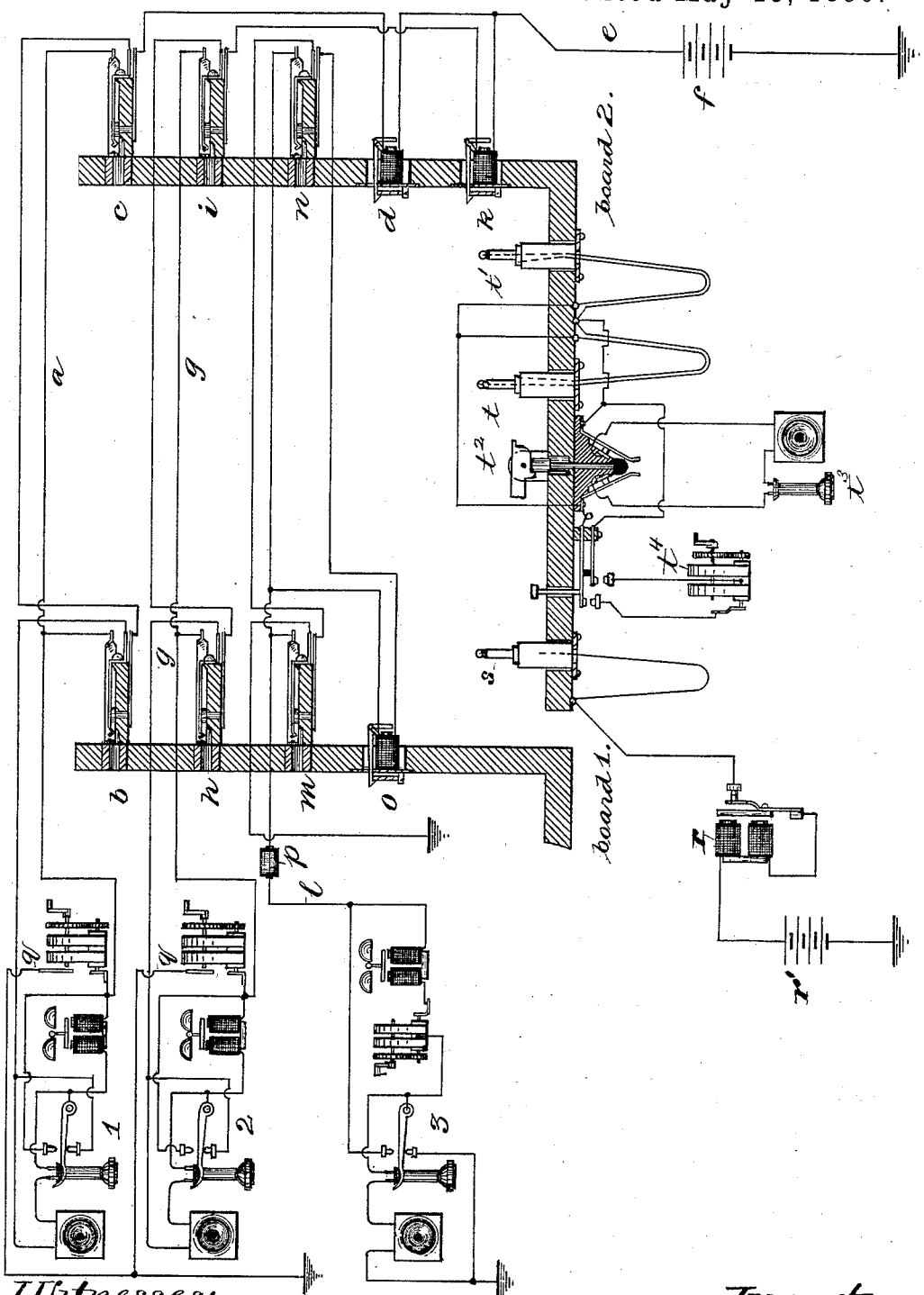
Witnesses:
Chas. G. Hawley.
Chas. C. Woodworth
Inventor:
Charles E. Scribner,
By George P. Barton
Attorney.

UNITED STATES PATENT OFFICE.

CHARLES E. SCRIBNER, OF CHICAGO, ILLINOIS, ASSIGNOR TO THE WESTERN ELECTRIC COMPANY, OF SAME PLACE.

MULTIPLE-SWITCH-BOARD TEST-CIRCUIT.

SPECIFICATION forming part of Letters Patent No. 427,624, dated May 13, 1890.

Application filed June 1, 1888. Renewed February 24, 1890. Serial No. 341,405. (No model.)

*To all whom it may concern:*

Be it known that I, CHARLES E. SCRIBNER, a citizen of the United States, residing at Chicago, in the county of Cook and State of Illinois, have invented a certain new and useful Improvement in Multiple-Switch-Board Test-Circuits, (Case 164,) of which the following is a full, clear, concise, and exact description, reference being had to the accompanying drawing, forming a part of this specification.

My invention relates to telephone-exchange apparatus, and its object is to provide for testing to determine whether a line called for is connected or in use, in order that confusion may be avoided.

My invention is designed more especially for use in multiple-switch-board systems in which metallic circuits and single-line circuits are used conjointly. Such systems I have sometimes termed "mixed systems."

My invention consists in the circuits and testing apparatus, as herein described and claimed.

My invention is illustrated in the accompanying drawing, in which I have shown two metallic telephone-circuits and a single-wire telephone-circuit connected with their switches, respectively, on two multiple switchboards, the calling, communicating, and testing apparatus being shown at one board only.

The metallic circuit $a$ may be traced from the test-pieces of the spring-jack switches $b\ c$, through the subscriber's station 1, and thence back through the spring and contact of said spring-jack switches to the individual annunciator $d$, and thence to common ground-wire $e$, which includes battery $f$. Metallic circuit $g$ may be traced in like manner from the test-pieces or test-rings of switches $h\ i$ of the different boards through station 2, and thence back through the spring and contact of said spring-jack switches $h\ i$ to individual annunciator $k$, and thence by common ground-wire $e$, through battery $f$, to ground. The circuit of single telephone-line $l$ may be traced from ground at subscriber's station 3 through test-rings or test-pieces of switches $m\ n$, and thence through individual annunciator $o$ of the line, and thence back through the contact and spring of each of said switches $n\ m$, and thence to ground at central office.

Ordinarily I find it necessary to place resistance $p$ of, say, two hundred and fifty ohms in each of the single-line circuits. It should be observed that the metallic circuits $a$ and $g$ are not grounded at their stations 1 and 2 normally. When the generator is operated at either of said stations, the ground-connection $q$ is closed. This may be done by simply pressing the finger against ground-contact $q$ or in any other suitable manner. The limb of each circuit which connects with the test-pieces of the series of spring-jack switches of the line is normally open, and hence the circuit of battery $f$, included in line $e$, is normally open.

The test apparatus shown at board 2 consists of a buzzer $r$, included, with battery $r'$, in a ground-circuit, said circuit terminating in a flexible cord and plug $s$ or other connecting device for closing the circuit of the buzzer to the test-piece of any of the spring-jack switches of the board. The pair of loop-plugs $t$ and $t'$, with their flexible cords, the listening-in key $t^2$, the telephone $t^3$, and the calling-generator $t^4$, (shown at board 2,) are of well-known construction.

The operator, seeing the shutter $d$ or $k$ fall, inserts one of the loop-plugs of the pair $t\ t'$ in a spring-jack switch of the line, thus bringing her telephone $t^3$ into circuit. She is then told by the subscriber what other line is wanted. She thereupon touches test-plug $s$ to the test portion of the spring-jack of the line called for upon her board, and if the buzzer $r$ responds she knows that the line, whether metallic or single, is free. If, however, the buzzer makes no sound when the test-plug $s$ is applied to the test portion of the spring-jack, she knows that the line is in use.

I have thus described, briefly, my apparatus and its operation. I will now describe more in detail the test apparatus and its mode of operation in connection with the metallic and single-circuit lines. The battery $r'$ and the buzzer $r$ are so adjusted with respect to electro-motive force and resistance that when test-plug $s$ is closed to a circuit containing resistance equal in amount to the resistance— say fifty ohms—of an individual annunciator the buzzer will be set in vibration. If the circuit, however, contains substantially more than fifty ohms' resistance, the buzzer will not respond. If, however, the two batteries $r'f$ be brought into circuit with buzzer $r$, the buzzer $r$ will respond, although the resistance of the circuit may be very great—say as high as one thousand ohms. Suppose, then, plug $s$ be applied to the test-piece of switch $n$ of the single circuit $l$. The circuit of battery $r'$ may be traced through the buzzer $r$ to plug $s$, thence to test-piece of switch $n$, and thence through the annunciator $o$ of the line, and thence through the contact and spring of switch $n$, and thence through contact and spring of switch $m$, and thence directly to ground. Under these conditions the buzzer $r$ will respond, since the circuit thus closed contains only the resistance of the coils of the annunciator $o$. I will now suppose when plug $s$ is applied to the test-ring of switch $n$ a connection has been made at the switch $m$ of the line upon another board. Under these conditions the lever of switch $m$ will be lifted from its contact and the circuit through the test apparatus may be traced, as before described, from the tip of plug $s$ to the test-piece of switch $n$, and thence through annunciator $o$, and thence through contact and spring of switch $n$, and thence to the contact of switch $m$, which is open. Thus in this direction battery $r'$ will find no circuit.

I will now trace the circuit in the other direction from the test-piece of switch $n$— that is to say, from plug $s$ to test-piece of switch $n$, thence over line $l$, through resistance $p$, to ground at station 3. This circuit $l$ contains so much resistance that the buzzer $r$ will not respond. Thus when plug $s$ is applied to a switch of a single line which is in use at another board the circuit through the annunciator of said line will be opened at the switch on the other board where the connection is made, and there will be no direct ground-circuit at the central office. Tracing in the other direction, the resistance of the single line will be so great that battery $r'$ will not be sufficient to operate the buzzer.

There is still a third circuit or branch, which I will now consider—that is to say, the circuit through the line that may be connected with said line which is being tested. Thus suppose connection made at switch $m$ by a pair of loop-plugs, like plugs $t\ t'$, with another single line. The frame or test-piece of switch $m$ would be closed to the sleeve of the loop-plug, and thence to the sleeve of the other loop-plug inserted in the switch of another line, and thence the circuit would be traced over the other single line to ground at the subscriber's station. This other line, however, would contain resistance of, say, two hundred and fifty ohms. Trace, then, from the test-piece of switch $n$. I should have a branch connection to the united circuit of two telephone-lines. Each circuit, however, would contain two hundred and fifty ohms, and hence their conjoined resistance would be, say, one hundred and twenty-five ohms, or substantially more than fifty ohms, to which the test apparatus is adjusted. Thus the buzzer would not respond when test-plug $s$ is thus applied to the test-piece of the switch of a line that is connected or in use. If the single line were connected with a metallic circuit, the resistance of the metallic circuit would be such that I should have practically the same conditions with respect to the buzzer $r$.

I will suppose now that a metallic circuit is called for. Test-plug $s$ will be applied in the same manner to the test-piece of the switch of the metallic circuit. Suppose line $g$ be the metallic circuit called for, and suppose plug $s$ applied to the test-piece of switch $i$, and suppose line $g$ not in use—that is to say, in the condition shown in the drawing. Tracing, however, the circuit from plug $s$ to the test-piece of switch $i$, I pass through the subscriber's station 2 and back through springs and contacts of switches $h\ i$ and annunciator $k$ on wire $e$ and battery $f$ to ground. The poles of batteries $r'$ and $f$ are in the same direction, and hence their electro-motive force will be sufficient to produce a current over the high-resistance circuit thus formed sufficient to operate the buzzer $r$. Thus if the metallic circuit is not in use the buzzer $r$ will respond the same as when a single circuit line not in use is tested. If two metallic circuits are united, it is evident that the battery $r'$ will find no circuit when test-plug $s$ is applied to the switch of one of the lines. If a metallic circuit be connected with a single-line circuit, the resistance of the circuit formed when plug $s$ is applied to the test-piece of a switch of said metallic circuit will be so great that the buzzer will not respond. Thus suppose a pair of loop-plugs inserted in switches $h\ m$ upon board 1, so as to unite circuits $g\ l$. The circuit thus formed between the two lines would be traced from ground at station 3 to the test-piece of switch $m$, thence to sleeve of the loop-plug inserted in switch $m$, thence to sleeve of loop-plug inserted in switch $h$, thence from the insulated frame or test-piece of switch $h$, through station 2, back to the spring of switch $h$, thence to the tip of the plug, thence to the tip of the plug inserted in switch $m$, and thence to the spring of switch $m$, and thence directly to ground. Plug $s$, being applied to the test-piece of switch $i$ of line $g$, would form a half-connection or branch connection with the united circuits of the two lines $l\ g$, and on each side of this half-connection the resistance would be so great that the buzzer $r$ could not respond.

My invention admits of various modifications, which would suggest themselves to those skilled in the art, and I therefore do not limit myself to the construction shown.

Having thus described my invention, I claim as new and desire to secure by Letters Patent—

1. The combination, with a line grounded at the central office and including battery, of several telephone-lines connected therewith and extending each through an individual annunciator, the contact-point and spring of several spring-jack switches on different boards, and thence through a subscriber's station, and thence back to the central office, and being there connected with the insulated frame or test-piece of each of the spring-jack switches of the line at each of the boards, a test-circuit including a battery and electro-magnetic signal device, and a movable terminal connecting device, the battery in the signal circuit and the battery in the common line having their poles in the same direction, the electro-motive force of said batteries and the resistance of the electro-magnetic signal, the resistance of the individual annunciators, and the resistance of the lines being adjusted as described, whereby it may be determined at any one of the boards whether any line called for is connected or in use at any other of the boards.

2. In a telephone-exchange, the combination, with multiple switch-boards, of metallic telephone-line circuits normally disconnected from ground at the subscribers' stations, respectively, thereon, each line extending in one branch through a spring-jack switch on each of the switch-boards and thence through an annunciator to a common ground-line including battery, the other branch of each circuit extending to the normally-open test-pieces of the spring-jack switches of its line, grounded telephone-lines extending to the same switch-boards connected with the insulated frame or test-piece of a different spring-jack switch on each of the switch-boards, and through an individual annunciator, and thence each connected back through the contact-point and spring of each of the spring-jack switches of its line and directly to ground, and a test-circuit including battery and an electro-magnetic signal device at each of the boards, and means for closing the test-circuit at any board with the frame or test-piece of any of the spring-jack switches thereon, whereby it may be determined whether any line called for at one board is connected or in use at any other board.

3. The combination, with a telephone-line extending from ground at the subscriber's station through two or more spring-jack switches distributed on different switch-boards of a telephone-exchange and directly to ground and an individual annunciator of a given resistance in said circuit between the test-pieces of the switches and contact-points and springs thereof, of a normally-open ground-circuit including a battery and an electro-magnetic signal device, the electro-magnetic signal device and battery being adjusted with respect to electro-motive force and resistance as described, and means for closing said test-circuit to the frame or test-piece of a spring-jack switch of said line, whereby circuit is closed through the annunciator of the line directly to ground, thus causing the electro-magnetic signal device or buzzer to respond when the spring-jacks of the line are closed, substantially as described.

4. The combination, with telephone-line $l$, extending from the subscriber's station 3 to the frames or contact-pieces of switches $m\ n$ on different multiple switch-boards, and thence through an annunciator $o$, and thence through the contact and spring at each of said switches $m\ n$, and thence directly to ground, of a test-circuit including a battery $r'$, an electro-magnetic signal device or buzzer $r$, and a connecting device $s$, the electro-motive force of said battery $r'$ and the resistance of electro-magnetic signal device $r$ being adjusted with respect to the resistance $p$ of line $l$ and the resistance of the individual annunciator $o$ as described, whereby it may be determined by closing the connecting device $s$ to the frame of either spring-jack switch of the line whether any other spring-jack switch of the line is open.

5. The telephone-line extending from ground at the subscriber's station to the test-pieces or frames of a series of spring-jack switches on different switch-boards, and thence through an annunciator, and thence through the contact-point and spring of each of said switches, and from the spring of the last switch to ground, the said line being provided with resistance between the subscriber's station and the spring-jack switches sufficient in amount to make the entire resistance of the line on the line side of the spring-jacks substantially more than twice the resistance of the portion of the line which includes the spring-jacks and the individual annunciator at the central office.

In witness whereof I hereunto subscribe my name this 8th day of May, A. D. 1888.

CHARLES E. SCRIBNER.

Witnesses:
 CHAS. C. WOODWORTH,
 CHAS. G. HAWLEY.